US008658574B2

(12) United States Patent
Li et al.

(10) Patent No.: US 8,658,574 B2
(45) Date of Patent: Feb. 25, 2014

(54) TREATMENT AND REUSE OF OILFIELD PRODUCED WATER FOR OPERATIONS IN A WELL

(75) Inventors: Leiming Li, Sugar Land, TX (US); Lijun Lin, Sugar Land, TX (US); Chucks I. Ezeokonkwo, Sonora, TX (US); Curtis L. Boney, Houston, TX (US); Paul R. Howard, Sugar Land, TX (US); Sudhir Shenoy, Clairmont (CA); Baudel William Quintero, Friendswood, TX (US); Ksenia Eliseeva, Bakersfield, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 840 days.

(21) Appl. No.: 12/410,160

(22) Filed: Mar. 24, 2009

(65) Prior Publication Data
US 2010/0248997 A1    Sep. 30, 2010

Related U.S. Application Data

(60) Provisional application No. 61/092,778, filed on Aug. 29, 2008.

(51) Int. Cl.
   *C23F 14/00* (2006.01)
(52) U.S. Cl.
   USPC ......... 507/271; 507/202; 507/211; 166/305.1
(58) Field of Classification Search
   USPC .................. 507/271, 202, 211, 225, 922; 166/305.1, 308.1, 308.3; 516/10, 11
   See application file for complete search history.

(56) References Cited

U.S. PATENT DOCUMENTS

| 3,913,673 | A | 10/1975 | Barber |
| 4,348,287 | A | 9/1982 | Jenkins |
| 4,514,309 | A | 4/1985 | Wadhwa |
| 4,736,005 | A | 4/1988 | Castner |

(Continued)

FOREIGN PATENT DOCUMENTS

| WO | 9401654 | 1/1994 |
| WO | 2008020388 | 2/2008 |
| WO | 2008142584 | 11/2008 |

OTHER PUBLICATIONS

Clarke, J.A. and Adams, L.S.—Irreversible Inhibition of Schizophyllum Commune Cellulase by Divalent Transition Metal Ions. 1987 Biochimica et Biophysica Acta 916, 213-219, University of Guelph, Guelph, Canada.

(Continued)

*Primary Examiner* — Alicia Bland
(74) *Attorney, Agent, or Firm* — Jeremy D. Tillman; Rachel Greene; Tim Curington (57) ABSTRACT

The invention discloses method of treatment and reuse of oilfield produced water. The method comprises: providing an aqueous medium comprised at least in part of oilfield produced water; contacting the aqueous medium with a zirconium compound; whereby the fluid viscosity and/or fluid drag reduction ability of the combination of the aqueous medium and zirconium compound is improved compared to the aqueous medium alone; introducing the combination in to the well; and allowing the combination to contact the formation. In another embodiment, the aqueous medium is further contacted by a friction-reduction additive. Still in another embodiment, the aqueous medium is further contacted by a gelling additive. Still in another embodiment, the fluid is energized with a gas.

8 Claims, 6 Drawing Sheets

(56) References Cited

U.S. PATENT DOCUMENTS

| | | |
|---|---|---|
| 4,905,761 A | 3/1990 | Bryant |
| 5,217,632 A | 6/1993 | Sharif |
| 5,441,109 A | 8/1995 | Gupta et al. |
| 5,501,275 A | 3/1996 | Card et al. |
| 5,551,516 A | 9/1996 | Norman et al. |
| 5,660,721 A | 8/1997 | Kyriss et al. |
| 5,667,012 A | 9/1997 | Hoover et al. |
| 5,782,300 A | 7/1998 | James et al. |
| 5,964,295 A | 10/1999 | Brown et al. |
| 5,979,555 A | 11/1999 | Gadberry et al. |
| 5,979,557 A | 11/1999 | Card et al. |
| 6,138,760 A | 10/2000 | Lopez et al. |
| 6,140,277 A | 10/2000 | Tibbles et al. |
| 6,214,773 B1 | 4/2001 | Harris et al. |
| 6,258,859 B1 | 7/2001 | Dahayanake et al. |
| 6,409,927 B1 | 6/2002 | Cardenas-Granguillhome et al. |
| 6,509,301 B1 | 1/2003 | Vollmer |
| 6,843,618 B2 | 1/2005 | Lundy |
| 6,875,728 B2 | 4/2005 | Gupta et al. |
| 7,013,974 B2 | 3/2006 | Hanes, Jr. |
| 7,494,957 B2 | 2/2009 | Pena et al. |
| 2002/0193343 A1 | 12/2002 | Khan et al. |
| 2005/0187114 A1 | 8/2005 | Lehman et al. |
| 2006/0166837 A1* | 7/2006 | Lin et al. ............ 507/211 |
| 2006/0178276 A1 | 8/2006 | Pena et al. |
| 2006/0211580 A1* | 9/2006 | Wang et al. ............ 507/209 |
| 2008/0064614 A1* | 3/2008 | Ahrenst et al. ............ 507/209 |
| 2008/0287323 A1* | 11/2008 | Li et al. ............ 507/211 |

OTHER PUBLICATIONS

Sapre, M.P., Jha, H. and Patil, M.B.—Purification and Characterization of a Thermostable-Cellulase free Xylanase from Syncephalastrum Racemosum Cohn. Journal of General and Applied Microbiology; 2005; pp. 327-334; vol. 51, issue No. 6; Nagpur University, Nagpur, India.

Sami, A.J .and Akhtar, M.W.—Purification and Characterization of Two Low-Molecular Weight Endoglucanases of Cellulomonas flavigena. Enzyme and Microbial Technology; Jul. 1993; pp. 586-592; vol. 15; No. 7; Institute of Chemistry, University of Punjab, Lahore, Pakistan.

International Search Report and Written Opinion, Application No. PCT/IB2009/053544 filed Aug. 11, 2009, dated Oct. 26, 2009.

\* cited by examiner

TREATMENT AND REUSE OF OILFIELD PRODUCED WATER FOR OPERATIONS IN A WELL

This application claims the benefit of U.S. Provisional Application No. 61/092,778, filed Aug. 29, 2008.

FIELD OF THE INVENTION

The invention relates to the treatment and reuse of water produced from a subterranean petroleum reservoir. More particularly, the invention relates to use of that produced water for operations in a well. Most particularly, the invention relates to use of that produced water for stimulation operations as slickwater, and for stimulation operations with energized fluids.

BACKGROUND

It is costly to clean up oilfield produced water, e.g., water produced from a wellbore along with oil and/or gas or otherwise from or in contact with a subterranean petroleum reservoir, for proper treatment for acceptable environmental disposal. On the other hand, sources of fresh water for oilfield treatment processes such as water flooding, subterranean fracturing, etc., can represent a significant expense. Applicants recognized that there is a potential cost savings to be realized by cost-efficiently treating oilfield produced water on-site and then reusing the treated water, for example, to prepare fracturing or other well treatment fluids. The potential cost reduction is at least two-fold: first, there is less cost to dispose of produced water; second, the net amount of fresh water required to be imported for making treatment fluids is reduced or eliminated.

Many commercial fracturing fluids are aqueous based gels or foams. When the fluids are gelled, a viscoelastic surfactant system or a polymeric gelling agent, such as a soluble polysaccharide, can be used. The thickened or gelled fluid helps keep the proppants within the well treatment fluid. Gelling with polymers can be accomplished or improved by the use of crosslinking agents, or crosslinkers, that promote crosslinking, thereby increasing the viscosity of the fluid. U.S. Pat. No. 5,217,632 to Sharif, for example, discloses a synergy between boron and zirconium compounds used as a crosslinking agent for polysaccharides in the same fluid for better stability in the presence of acids, bases, boiling, high dilution and/or aging.

Following placement of a proppant or gravel pack with the viscosified fluid, the hydraulic conductivity of the fracture and the adjacent formation can be established by reducing the viscosity of the fracturing fluid to a low value so that it may flow naturally from the formation under the influence of formation fluids. Crosslinked gels typically rely on viscosity breakers to initiate and/or accelerate the reduction of viscosity or "break" the gel.

Unfortunately, when oilfield produced water was used "as is" (untreated) to prepare fracturing fluids, applicants found that the viscosity of the fluids thus prepared usually quickly deteriorated in much the same manner as if a viscosity breaker had been prematurely activated in the fluid. Also, when oilfield produced water was used "as is" to prepare slickwater, the applicants found that this fluid shows poor fluid viscosity and/or drag reduction. Through a number of control experiments, applicants identified likely causes of the fluid failure as the degradation of polysaccharide or polysaccharide derivatives by bacteria and/or related enzymes present in the produced water. However, bactericides used at typical, antimicrobially effective concentrations were found to have little or no effect on improving the viscosification of the fluid. There is thus an unfulfilled need in the art for a cost-effective treatment of oilfield produced water so that the water can be used in the preparation of otherwise conventional viscosified fracturing fluids when employing standard gelling agents, or otherwise conventional slickwater fluids showing same enhanced fluid viscosity as it would be using non-produced water.

SUMMARY OF THE INVENTION

We have found that oilfield produced water may contain microorganisms, related enzymes, or both, that can lead to premature fluid viscosity loss when the water is reused in viscosified fluids, e.g., well treatment fluids. Water containing the microorganisms and/or enzymes is pretreated with a metal compound to at least temporarily inactivate the microorganisms and/or enzymes. Thereafter, the treated water is used to prepare a fluid for a well treatment procedure without loss of viscosity, and without loss of conductivity in the case of a fracturing fluid.

One embodiment of the invention provides a method of treating a subterranean formation in a well. The method comprises: providing an aqueous medium comprised at least in part of oilfield produced water; contacting the aqueous medium with a zirconium compound; whereby the fluid viscosity and/or fluid drag reduction ability of the combination of the aqueous medium and zirconium compound is improved compared to the aqueous medium alone; introducing the combination in to the well; and allowing the combination to contact the formation. In an embodiment, the aqueous medium can include oilfield produced water. The fluid viscosity of the combination of the aqueous medium and zirconium compound is increased compared to the aqueous medium alone. The fluid drag reduction ability of the combination of the aqueous medium and zirconium compound is better compared to the fluid drag reduction ability of the aqueous medium alone. In another embodiment, the contact can include admixing the zirconium compound in the aqueous medium at a concentration from 1 to 2000 ppm by weight of the aqueous medium or, in an embodiment, at a concentration from 5 to 500 ppm by weight of the aqueous medium.

In an embodiment, the zirconium compound can include an inorganic zirconium compound. In an embodiment, the inorganic zirconium compound can be selected from the group consisting of zirconium nitrate, zirconyl chloride, zirconium phosphate, zirconium potassium chloride, zirconium potassium fluoride, zirconium potassium sulfate, zirconium pyrophosphate, zirconium sulfate, zirconium tetrachloride, zirconium tetrafluoride, zirconium tetrabromide, zirconium tetraiodide, zirconyl carbonate, zirconyl hydroxynitrate, zirconyl sulfate, and the like, and also including any hydrates thereof and combinations thereof. In another embodiment, the mixing can be within 0 to 120 hours of the contacting. In another embodiment, the aqueous medium can be free of detectable sulfide.

In an embodiment, the zirconium compound can include an organo-zirconium compound. In an embodiment, the organo-zirconium compound can be selected from the group consisting of zirconium acetate, zirconyl acetate, zirconium acetylacetonate, zirconium glycolate, zirconium lactate, zirconium naphthenate, sodium zirconium lactate, triethanolamine zirconium, zirconium propionate, and the like, and also including any hydrates thereof and combinations thereof. In another embodiment, the mixing can be within 0 to 72 hours of the contacting. In another embodiment, the aqueous medium can include detectable sulfide.

In an embodiment, the denaturant (the zirconium compound) can further comprise a bactericide. In another embodiment, the denaturant can include both a bactericide and a zirconium compound. In this embodiment, the mixing can be within 0 to 120 hours of the contacting. In an embodiment, the denaturant can include an inorganic zirconium compound in combination with an organo-zirconium compound, and in another embodiment, a bactericide as well. In these embodiments, the mixing can be within 0 to 120 hours of the contacting.

The method can further comprise the step of: introducing proppant in to the well; whereby the combination of the aqueous medium and zirconium compound allows better transport capability of the proppant in to the formation compared to the aqueous medium alone.

The method can further comprise the step of: energizing the combination of the aqueous medium and the zirconium compound with a gas. The gas can be carbon dioxide, nitrogen, air, or combined.

Another embodiment of the invention provides a method of treating a subterranean formation in a well. The method comprises: providing an aqueous medium comprised at least in part of oilfield produced water; contacting the aqueous medium with a zirconium compound and with a friction-reducing additive; whereby the fluid viscosity and/or fluid drag reduction ability of the combination of the aqueous medium, zirconium compound and friction-reducing additive is improved compared to the aqueous medium and friction-reducing additive alone; introducing the combination in to the well; and allowing the combination to contact the formation. The fluid viscosity of the combination of the aqueous medium, zirconium compound and friction-reducing additive is increased compared to the aqueous medium and friction-reducing additive alone. The fluid drag reduction ability of the combination of the aqueous medium, zirconium compound and friction-reducing additive is better compared to the fluid drag reduction ability of the aqueous medium and friction-reducing additive alone.

In an embodiment, the friction-reducing additive is an anionic, cationic, or nonionic friction-reducing additive, including acrylamide polymers and copolymers. In another embodiment, the friction-reducing additive is polysaccharide including guar and derivatized guar.

The method can further comprise the step of: introducing proppant in to the well; whereby the combination of the aqueous medium, the zirconium compound and friction-reducing additive allows better transport capability of the proppant in to the formation compared to the aqueous medium and friction-reducing additive alone.

The method can further comprise the step of: energizing the combination of the aqueous medium, the zirconium compound and friction reducing additive with a gas. The gas can be carbon dioxide, nitrogen, air, or combined.

Still another embodiment of the invention provides a method of treating a subterranean formation in a well. The method comprises: providing an aqueous medium comprised at least in part of oilfield produced water; contacting the aqueous medium with a zirconium compound and with a gelling additive to form a viscosified fluid; whereby the fluid viscosity and/or fluid drag reduction ability of the viscosified fluid made of combination of the aqueous medium, zirconium compound and gelling additive is improved compared to the aqueous medium and gelling additive alone; introducing the combination in to the well; and allowing the combination to contact the formation. The fluid viscosity of the combination of the aqueous medium, zirconium compound and gelling additive is increased compared to the aqueous medium and gelling additive alone. The fluid drag reduction ability of the combination of the aqueous medium, zirconium compound and gelling additive is better compared to the fluid drag reduction ability of the aqueous medium and gelling additive alone.

In an embodiment, the gelling additive can include a viscoelastic surfactant system. In an embodiment, the gelling additive can include a polysaccharide, which in another embodiment, can be crosslinked. Another embodiment can include injecting the viscosified fluid into a subterranean formation adjacent a well bore. A further embodiment can include breaking the injected fluid and producing fluid from the formation through the well bore. In an embodiment, the viscosified fluid can further include proppant and the injection can form a conductive fracture in the formation held open by the proppant.

The method can further comprise the step of: introducing proppant in to the well; whereby the combination of the aqueous medium, the zirconium compound and gelling additive allows better transport capability of the proppant in to the formation compared to the aqueous medium and gelling additive alone.

The method can further comprise the step of: energizing the combination of the aqueous medium, the zirconium compound and gelling additive with a gas. The gas can be carbon dioxide, nitrogen, air, or combined.

DETAILED DESCRIPTION

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

"Oilfield produced water" or simply "produced water" includes water that is produced with oil or gas, produced from petroleum-bearing subterranean strata, or otherwise contaminated with hydrocarbons in conjunction directly or indirectly with the production of subterranean fluids. As further representative examples in addition to production water per se there can also be mentioned flowback water, e.g. from a stimulation or workover treatment, reserve pit water, water circulated out of wellbore, and so on, including any combinations thereof.

The term "aqueous media" refers to any liquid system comprising water, optionally including dissolved solutes or dispersed or aggregated undissolved solids. An "aqueous solution" is a portion of water which includes dissolved solids, but which can further include undissolved solids. Reference to zirconium compounds, denaturants or other materials associated with aqueous media shall be construed to encompass any dispersed, dissolved, chelated, hydrated, ionic, and dissociated forms of the zirconium compounds, denaturants or other materials as they may exist in the aqueous media. For example, zirconium sulfate may form various hydrates and/or partially dissociate into ions in water, and the recitation of the term "zirconium sulfate" in the specification and claims is intended to encompass zirconium sulfate per se as well as any or all of the hydrates, ions, chelates, solutes or various other forms of zirconium sulfate.

Zirconium and hafnium are quite difficult to separate during the refining process due to their similar chemical properties. It is reasonable to speculate that there could be certain amount of hafnium in the zirconium compounds. A "zirconium compound" as used herein refers to the compound of zirconium where the zirconium atoms may be replaced with hafnium atoms to an extent of from 0% to 100%.

An "organic compound" as used herein refers to compounds of, containing or relating to carbon, and especially carbon compounds that are or are potentially active in biological systems.

The presence or absence of detectible sulfides in an aqueous medium such as oilfield produced water can be determined directly by smell or chemical analysis. Many people can smell hydrogen sulfide at concentrations in air at about 0.0047 ppm by volume. The sulfides can originate from the subsurface strata from which the water is produced, or from the action of exogenous sulfate-reducing bacteria if there is sulfate present in the produced water.

The water is pretreated in one embodiment by contact with a zirconium compound having the function to denature or otherwise disable the enzymes and/or bacteria. In one embodiment, the zirconium is used in a form that can be at least slightly soluble in the aqueous medium, and in another embodiment is in a form that is soluble in water. In one embodiment, the water is treated by contact with the zirconium in a solid form, e.g., in a heterogeneous system. In another embodiment, the zirconium is soluble or slightly soluble at the conditions of contact, e.g., temperature, pH, ionic strength, presence of chelates, etc., to result in a homogenous treatment system.

In preferred but not exclusive embodiments, the zirconium can be an inorganic zirconium compound, an organic zirconium compound, or can include both inorganic zirconium and organo-zirconium. In an embodiment, the zirconium compound can be selected from the group consisting of zirconium nitrate, zirconyl chloride, zirconium phosphate, zirconium potassium chloride, zirconium potassium fluoride, zirconium potassium sulfate, zirconium pyrophosphate, zirconium sulfate, zirconium tetrachloride, zirconium tetrafluoride, zirconium tetrabromide, zirconium tetraiodide, zirconyl carbonate, zirconyl hydroxynitrate, zirconyl sulfate, zirconia hydrate, zirconium carbide, zirconium nitride, zirconium hydroxide, zirconium orthosilicate, zirconium tetrahydroxide, zirconium tungstate, and the like, and also including any hydrates thereof and combinations thereof. Inorganic zirconium compounds can be beneficial where quick-acting, long-duration treatment is desired.

In an embodiment, the organo-zirconium compound can be selected from the group consisting of zirconium acetate, zirconyl acetate, zirconium acetylacetonate, zirconium glycolate, zirconium lactate, zirconium naphthenate, triethanolamine zirconium, zirconocene dihalides, and the like, and also including any hydrates thereof and combinations thereof. Sodium or potassium zirconium alpha hydroxyl carboxylates such as lactates, citrates, tartrates, glycolates, maleates, saccharates, gluconates, glycerates, mandelates and the like can also be mentioned. Organo-zirconium compounds can be beneficial where the presence or possible presence of sulfide or similar anions may otherwise precipitate or inactivate inorganic zirconium compounds.

The organo-zirconium compound may also be zirconium complexed with alpha or beta amino acids, phosphonic acids, salts and derivatives thereof. The ratio of metal to ligand in the complex can range from 1:1 to 1:4. Preferably the ratio metal to ligand can range from 1:1 to 1:6. More preferably the ratio metal to ligand can range from 1:1 to 1:4. Those complexes can be used to crosslink the hydratable polymers. The following acids and their salts were found to be useful ligands: alanine, arginine, asparagines, aspartic acid, cysteine, glutamic acid, glutamine, glycine, histidine, isoleucine, leucine, lysine, methyonine, phenyl alanine, praline, serine, threonine, tryptophan, tyrosine, valine, carnitine, ornithine, taurine, citrulline, glutathione, hydroxyproline. The following acids and their salts were found to be suitable ligands: DL-Glutamic acid, L-Glutamic acid, D-Glutamic acid, DL-Aspartic acid, D-Aspartic acid, L-Aspartic acid, beta-alanine, DL-alanine, D-alanine, L-alanine, Phosphonoacetic acid. Zirconium IV was found to be preferred metal to form complexes with various alpha or beta amino acids, phosphonic acids and derivatives thereof.

In one embodiment, the organo-zirconium compound comprises zirconium complexed with a beta-diketone compound and an alkoxy group having a branched alkyl group according to the following formula (1):

(1)

wherein R is a branched alkyl group having 4 or 5 carbons; and L1, L2, and L3, are the same or different from each other and are each a beta-diketone compound.

The zirconium compound in an embodiment can also include further a bactericidally effective amount of a bactericide. The bactericide in one embodiment is an organic bactericide that inhibits the growth of bacteria in the aqueous medium, or at least suppresses the expression of enzymes, but may not be effective to denature the enzymes. The bactericide can be beneficial in an embodiment where the metal compound is not effective to kill or prevent the growth of bacteria in the amount employed, or where the metal compound and the bactericide have a synergistic effect in either or both the denaturing of enzymes or the destruction of bacteria. Representative examples of bactericides include glutaraldehyde, tetrakishydroxymethyl phosphonium sulfate, and the like.

The type and amount of zirconium compound used to treat the produced water depends on several factors, such as, but not exclusively limited to, the nature and extent of enzyme/bacteria in the water, the presence of species that might adversely react with the zirconium, and the type of system in which the treated water will be used. For example, zirconium compounds might, if employed in excessive amounts, have a possibly adverse effect on polymer gelation, e.g., a resulting fluid of many small gel domains with low viscosity. If the zirconium has not been allowed to sufficiently interact with the bacteria and/or enzyme, it can interact with, for example, borate crosslinkers. In one embodiment, a zirconium compound is used in an amount from 1 ppm or less up to 2000 ppm or more, by weight of the zirconium compound in the aqueous medium. In an embodiment, the metal compound is zirconium compound if sulfide is or may be present in the system. For example, in embodiments where sulfate-reducing bacteria may be or may become present, the organo-zirconium compound can be employed if the sulfate concentration in the water is more than 200, 400, 800 or 1600 ppm by weight. On the other hand, in another embodiment inorganic zirconium compounds can be used as the sole denaturant where sulfide might be present or formed only in amounts insufficient to inactivate them, for example where sulfate reducing bacteria may be or become present in embodiments where the sulfate concentration is less than 1600, 800, 400 or 200 ppm by weight.

In an embodiment, the mixing of the viscosification system with the treated water can occur after a period of time sufficient to allow the denaturant to inactivate the enzymes and/or bacteria, and before the treatment begins to have diminished effectiveness. If the mixing step occurs too soon, the enzymes may still be sufficiently active to adversely affect the viscosity of the fluid, or the raw denaturant may adversely affect viscosity unless it is allowed to equilibrate or be fully "consumed" by the enzymes and/or bacteria. In embodiments, 0, 0.5, 1 or 2 hours can be a suitable minimum period for the denaturant to effectively treat the produced water, whereas 1, 2, 3, 4 or 5 days can be a suitable maximum period before the enzymatic and/or bacteriological system may be able to use up or overwhelm the denaturant and re-establish to interfere with the viscosification system. In an embodiment employing an inorganic zirconium compound the treatment window can be as little as 0 hour to 3 days or more. In an embodiment employing an organic zirconium compound the treatment window can be as little as 0 hour to 5 days or more. In embodiments employing a combination of an inorganic zirconium compound and an organic zirconium compound, or a combination of an inorganic zirconium compound, an organic zirconium compound, and a bactericide, the treatment window can be as little as 0 hour to 5 days or more.

The treated water can be reused in a well treatment fluid in various conventional applications without deleterious consequences or fluid failure. Embodiments include hydraulic fracturing fluids, slickwater, gravel packs, water conformance control, acid fracturing, waterflood, drilling fluids, wellbore cleanout fluids, fluid loss control fluids, kill fluids, spacers, flushes, pushers, and carriers for materials such as scale, paraffin, and asphaltene inhibitors, and the like. Viscosification systems can include polymers, including crosslinked or un-crosslinked polymers, friction-reduction additive, viscoelastic surfactant systems (VES), fiber viscosification systems, mixed fiber-polymer and fiber-VES systems, slickwater (low viscosity) systems, and so on.

The present invention is discussed herein with specific reference to the embodiment of hydraulic fracturing, but it is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore.

In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

The treatment fluid based on the reused water according to an embodiment of the present invention is beneficial in embodiments where the viscosity of the viscosified treatment fluid is at least 3, 50, 100, 150, or 200 cP at 25° C., and especially where the treatment fluid is maintained at elevated temperatures without viscosity failure for 30, 60, 90 or 180 minutes or more. Embodiments of polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other embodiments of effective water-soluble polymers (provided that specific examples chosen are compatible with the denaturants of the invention) include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, other galactomannans, heteropolysaccharides obtained by the fermentation of starch-derived sugar (e.g., xanthan gum), and ammonium and alkali metal salts thereof.

Cellulose derivatives are also used in an embodiment, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent proppant-suspension ability even though they are more expensive than guar derivatives and therefore have been used less frequently unless they can be used at lower concentrations.

Friction reducing polymers can be used in another embodiment for slickwater treatments. More particularly, the friction reducing polymers are anionic friction reducing polymers. Suitable anionic friction reducing polymers should reduce energy losses due to turbulence within the treatment fluid. Those of ordinary skill in the art will appreciate that the anionic friction reducing polymer(s) included in the treatment fluid should have a molecular weight sufficient to provide a desired level of friction reduction. In general, polymers having higher molecular weights may be needed to provide a desirable level of friction reduction. By way of example, the average molecular weight of suitable anionic friction reducing polymers may be at least about 2,500,000, as determined using intrinsic viscosities. In certain exemplary embodiments, the average molecular weight of suitable anionic friction reducing polymers may be in the range of from about 7,500,000 to about 20,000,000. Those of ordinary skill in the art will recognize that anionic friction reducing polymers having molecular weights outside the listed range may still provide some degree of friction reduction.

A wide variety of anionic friction reducing polymers may be suitable for use with the present technique. By way of example, suitable anionic friction reducing polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

One example of a suitable anionic friction reducing polymer is a polymer comprising acrylamide and acrylic acid. The acrylamide and acrylic acid may be present in the polymer in any suitable concentration. An example of a suitable polymer may comprise acrylamide in an amount in the range of from about 5% to about 95% and acrylic acid in an amount in the range of from about 5% to about 95%. Another example of a suitable polymer may comprise acrylamide in an amount in the range of from about 60% to about 90% by weight and acrylic acid in an amount in the range of from about 10% to about 40% by weight. Another example of a suitable polymer may comprise acrylamide in an amount in the range of from about 80% to about 90% by weight and acrylic acid in an amount in the range of from about 10% to about 20% by weight. Yet another example of a suitable polymer may comprise acrylamide in an amount of about 85% by weight and acrylic acid in an amount of about 15% by weight. As previously mentioned, one or more additional monomers may be included in the polymer comprising acrylamide and acrylic acid. By way of example, the additional monomer(s) may be present in the anionic friction reducing polymers in an amount up to about 20% by weight of the polymer.

Friction reducing polymers can also include guar, and derivativized guar, such as hydroxylpropyl guar (HPG), carboxymethlyhydroxypropyl guar (CMHPG), and others, cellulose polymers including hydroxyethylcellulose (HEC), carboxymethylhydroxyethyl cellulose (CMHEC), starch and starch derivatives, biopolymers such as xanthan and derivatives of biopolymers, and surfactant based systems such as viscoelastic surfactant fluids.

Linear (not cross-linked) polymer systems can be used in another embodiment, but generally require more polymer for the same level of viscosification.

All crosslinked polymer systems may be used, including for example delayed, optimized for high temperature, optimized for use with sea water, buffered at various pH's, and optimized for low temperature. Any crosslinker may be used, for example boron, titanium, and zirconium. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid. Any other chemical additives can be used or included provided that they are tested for compatibility with the fibers and fiber degradation products of the invention (neither the fibers or their degradation products or the chemicals in the fluids interfere with the efficacy of one another or with fluids that might be encountered during the job, like connate water or flushes). For example, some of the standard crosslinkers or polymers as concentrates usually contain materials such as isopropanol, n-propanol, methanol or diesel oil.

As mentioned, viscoelastic surfactant fluid systems (such as cationic, amphoteric, anionic, nonionic, mixed, and zwitterionic viscoelastic surfactant fluid systems, especially betaine zwitterionic viscoelastic surfactant fluid systems or amidoamine oxide surfactant fluid systems) may be also used provided that they are tested for compatibility with the denaturant and denaturant degradation products of the invention. Non-limiting examples include those described in U.S. Pat. Nos. 5,551,516; 5,964,295; 5,979,555; 5,979,557; 6,140,277; 6,258,859 and 6,509,301, all hereby incorporated by reference. The solid acid/pH control agent combination of this invention has been found to be particularly useful when used with several types of zwitterionic surfactants. In general, suitable zwitterionic surfactants have the formula:

$$RCONH—(CH_2)_a(CH_2CH_2O)_m(CH_2)_b—N^+(CH_3)_2—(CH_2)_{a'}(CH_2CH_2O)_{m'}(CH_2)_{b'}COO^-$$

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. Preferred surfactants are betaines.

Two examples of commercially available betaine concentrates are, respectively, BET-O-30 and BET-E-40. The VES surfactant in BET-O-30 is oleylamidopropyl betaine. It is designated BET-O-30 because as obtained from the supplier (Rhodia, Inc. Cranbury, N.J., U.S.A.) it is called Miratine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, was used in the experiments described above; one chemical name is erucylamidopropyl betaine. BET surfactants, and others that are suitable, are described in U.S. Pat. No. 6,258,859. Certain co-surfactants may be useful in extending the brine tolerance, to increase the gel strength, and to reduce the shear sensitivity of VES fluids, in particular for BET-O-type surfactants. An example given in U.S. Pat. No. 6,258,859 is sodium dodecylbenzene sulfonate (SDBS). VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate.

In another embodiment, suitable fibers can assist in transporting, suspending and placing proppant in hydraulic fracturing and gravel packing and can optionally also degrade to minimize or eliminate the presence of fibers in the proppant pack without releasing degradation products that either a) react with certain multivalent ions present in the fracture water or gravel packing carrier fluid, or formation water to produce materials that hinder fluid flow, or b) decrease the ability of otherwise suitable metal-crosslinked polymers to viscosify the carrier fluid. Systems in which fibers and a fluid viscosified with a suitable metal-crosslinked polymer system or with a VES system are known to the skilled artisan to slurry and transport proppant as a "fiber assisted transport" system, "fiber/polymeric viscosifier" system or an "FPV" system, or "fiber/VES" system. Most commonly the fiber is mixed with a slurry of proppant in crosslinked polymer fluid in the same way and with the same equipment as is used for fibers used for sand control and for prevention of proppant flowback, for example, but not limited to, the method described in U.S. Pat. No. 5,667,012. In fracturing, for proppant transport, suspension, and placement, the fibers are normally used with proppant or gravel laden fluids, not normally with pads, flushes or the like.

Any conventional proppant (gravel) can be used. Such proppants (gravels) can be natural or synthetic (including but not limited to glass beads, ceramic beads, sand, and bauxite), coated, or contain chemicals; more than one can be used sequentially or in mixtures of different sizes or different materials. The proppant may be resin coated, preferably pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, preferably from about 0.12 to about 0.72 kg/L, preferably from about 0.12 to about 0.54 kg/L. The viscosified proppant slurry can be designed for either homogeneous or heterogeneous proppant placement in the fracture, as known in the art.

Also optionally, the fracturing fluid can contain materials designed to limit proppant flowback after the fracturing operation is complete by forming a porous pack in the fracture zone. Such materials can be any known in the art, such as fibers, such as glass fibers, available from Schlumberger under the trade name PropNET™ (for example see U.S. Pat. No. 5,501,275). Exemplary proppant flowback inhibitors include fibers or platelets of novoloid or novoloid-type polymers (U.S. Pat. No. 5,782,300). Thus the fracturing system may contain different or mixed fiber types, for example non-degradable or degradable only at a higher temperature, present primarily to aid in preventing proppant flowback. The system may also contain another fiber, such as a polyethylene terephthalate fiber, which is also optimized for assisting in transporting, suspending and placing proppant, but has a higher degradation temperature and would precipitate calcium and magnesium without preventive measures being taken. As has been mentioned, appropriate preventive measures may be taken with other fibers, such as, but not limited to, pumping a pre-pad and/or pumping an acid or a chelating dissolver, adsorbing or absorbing an appropriate chelating agent onto or into the fiber, or incorporating in the fluid precipitation inhibitors or metal scavenger ions that prevent precipitation.

Any additives normally used in such well treatment fluids can be included, again provided that they are compatible with the other components and the desired results of the treatment. Such additives can include, but are not limited to breakers, anti-oxidants, crosslinkers, corrosion inhibitors, delay agents, biocides, buffers, fluid loss additives, pH control agents, solid acids, solid acid precursors, etc. The wellbores treated can be vertical, deviated or horizontal. They can be completed with casing and perforations or open hole.

The pad and fracturing fluid can both be prepared using the zirconium treated produced water according to an embodiment of the invention. A pad and fracturing fluid are viscosified because increased viscosity results in formation of a wider fracture, thus a larger flowpath, and a minimal viscosity is required to transport adequate amounts of proppant; the actual viscosity required depends primarily upon the fluid flow rate and the density of the proppant. In a typical fracturing process, such as hydraulic fracturing with aqueous fluids, the fracture is initiated by first pumping a high viscosity aqueous fluid with good to moderate leak-off properties, and typically no proppant, into the formation. This pad is usually followed by a carrier fluid of similar viscosity carrying an initially low concentration and then a gradually increasing concentration of proppant into the extended fractures. The pad initiates and propagates the fracture but does not need to carry proppant. All the fluids tend to "leak-off" into the formation from the fracture being created. Commonly, by the end of the job the entire volume of the pad will have leaked off into the formation. This leak-off is determined and controlled by the properties of the fluid (and additives it may contain) and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the end of the fracture, stopping the lengthening of the fracture and resulting in a subsequent increase in the fracture width. On the other hand, excessive leak-off is undesirable because it may waste valuable fluid and result in reduced efficiency of the job. Proper leak-off control is therefore critical to job success.

Fluid technologies incorporating a gaseous component or a supercritical fluid to form a foam or energized fluid are commonly used in the stimulation of oil and gas wells. For example, some viscoelastic fluids used as fracturing fluids contain a gas such as air, nitrogen or carbon dioxide to provide an energized fluid or foam. Such fluids are commonly formed by injecting an aqueous solution ("base fluid") concomitantly with a gas, most commonly nitrogen, carbon dioxide or their mixtures, into the formation. Among other benefits, the dispersion of the gas into the base fluid in the form of bubbles or droplets increases the viscosity of such fluid and impacts positively its performance, particularly its ability to effectively induce hydraulic fracturing of the formation, and also its capacity to carry solids ("proppants") that are placed within the fractures to create pathways through which oil or gas can be further produced. The presence of the gas also enhances the flowback of the base fluid from the interstices of the formation and of the proppant pack into the wellbore, due to the expansion of such gas once the pressure is reduced at the wellhead at the end of the fracturing operation. Other common uses of foams or energized fluids include wellbore cleanout, gravel packing, acid diversion, fluid loss control, and the like. U.S. Pat. No. 7,494,957 and U.S. Application Publication Nos. US2006/0166837 and US2006/0178276, each of which is incorporated by reference in its entirety, describe that by combining a heteropolysaccharide, concomitantly with a gas, an electrolyte, and a surfactant, an aqueous energized fluid is provided with exceptional rheology properties, particle suspension and particle transport capabilities, as well as gas phase stability, especially at elevated temperatures. As such, aqueous energized fluids may include an aqueous medium, a gas component, a heteropolysaccharide, an electrolyte, and a surfactant. The aqueous medium is usually water or brine. The fluids may also include an organoamino compound.

The viscosity of the fluid in which the gas is dispersed affects the resulting viscosity and stability of the foam. In general, foams are more stable and viscous as the viscosity of the base fluid increases. For this reason, high molecular weight polymers are commonly added to increase the viscosity of the base fluid. Commonly used polymers for fracturing applications are polysaccharides such as cellulose, derivatized cellulose, guar gum, derivatized guar gum, xanthan gum, or synthetic polymers such as polyacrylamides and polyacrylamide copolymers.

Foamed and energized fracturing fluids invariably contain "foamers", most commonly surfactants or blends of surfactants that facilitate the dispersion of the gas into the base fluid in the form of small bubbles or droplets, and confer stability to the dispersion by retarding the coalescence or recombination of such bubbles or droplets. Foamed and energized fracturing fluids are generally described by their foam quality, i.e. the ratio of gas volume to the foam volume. If the foam quality is between 52% and 95%, the fluid is conventionally called foam, and below 52%, an energized fluid. However, as used herein the term "energized fluid" is defined as any stable mixture of gas and liquid, notwithstanding the foam quality value.

EXAMPLES

A series of experiments were conducted to compare effectiveness of well treatment fluids comprising produced water prepared using treated or "as is" samples.

To illustrate some embodiments according to the invention, analysis was conducted on produced water from Texas oilfields. The water usually had high salt content (about 2-5% or more NaCl) and high hardness (>120 mg/L Ca and Mg ions combined). The water also may have had oil contamination, suspensions, precipitations, and/or hydrogen sulfide smell. The ion species and respective concentrations for the produced water samples are listed in Table 1.

TABLE 1

Ion Concentrations in Produced Water Samples (mg/L).

| Produced water sample | Na | K | Ca | Mg | Fe | Al | Si | Cl⁻ | $CO_3^{2-}$ | $HCO_3^-$ | $SO_4^{2-}$ |
|---|---|---|---|---|---|---|---|---|---|---|---|
| PW1 | 9270 | 175 | 1490 | 152 | 0 | 0 | 4 | 17371 | 0 | 192 | <800 |
| PW2 | 11100 | 151 | 1160 | 445 | 0 | 0 | 25 | 20738 | 0 | 168 | <200 |

Figure 1:
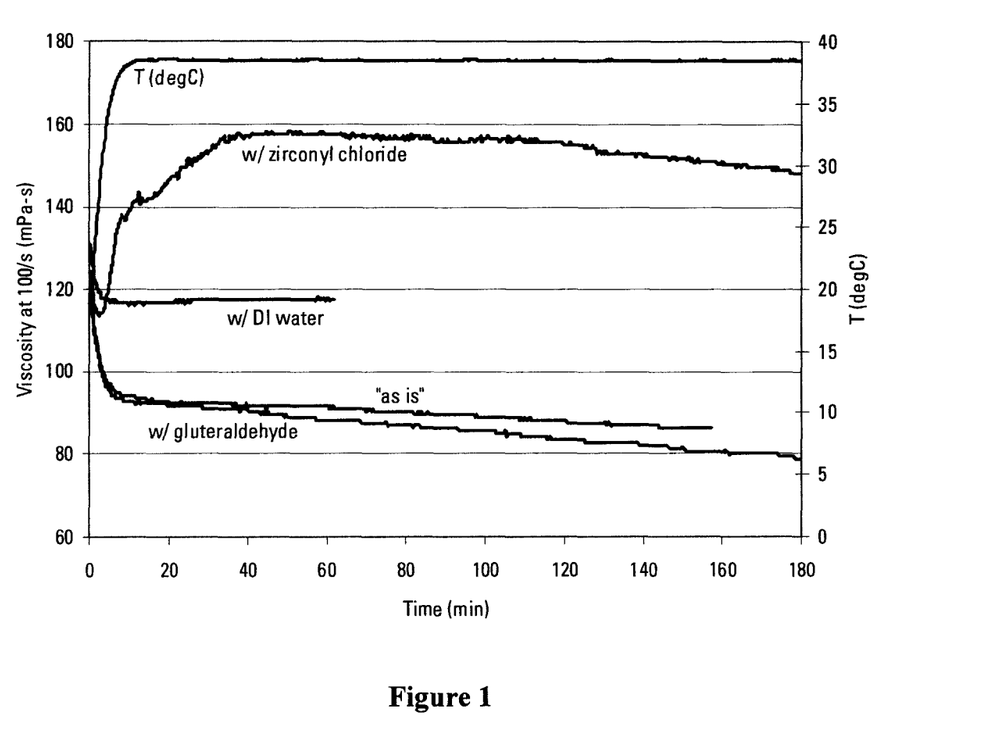
FIG. 1 shows viscosity profiles at 37.8 deg C. for guar gum in de-ionized water, guar gum in "as is" (untreated) produced water, guar gum in produced water treated with glutaraldehyde, and guar gum in produced water treated with zirconyl chloride, respectively.

Viscosity was measured for three fluids prepared with the produced water PW1: (1) 0.48% guar gum in the "as is" (untreated) produced water, (2) 0.48% guar gum in the produced water treated with 0.005% glutaraldehyde, and (3) 0.48% guar gum in the produced water treated with 0.0072% zirconyl chloride. A control sample with 0.48% guar gum in de-ionized (DI) water was also made. The treating time of glutaraldehyde was about 0 to 5 minutes, and the treating time of zirconyl chloride was about 0 to 10 minutes or more. Glutaraldehyde or zirconyl chloride was added at the same time as or prior to the addition of guar gum. After the guar hydration, the fluids were loaded in a Fann50-type viscometer to measure the viscosity evolution. The viscosity change at room temperature (about 20 deg C.) was very slow, but became more visible at 37.8 deg C. (100 deg F.) or over. FIG. 1 shows the viscosity profiles at 37.8 deg C. for the 4 fluids studied. The control sample prepared with de-ionized water showed a nearly straight viscosity-time curve (after fluid temperature reaching 37.8 deg C.). Both fluids, i.e., the guar gum in the "as is" produced water and the guar gum in the glutaraldehyde-treated produced water, showed declining viscosity curves below the viscosity of the control sample (in de-ionized water). The fluid based upon the zirconyl chloride-treated produced water showed a higher viscosity than the control even after 3 hours. At 1 hour, the viscosity of the fluid based upon the zirconyl chloride-treated produced water was over 70% larger than the viscosity of the fluid based upon the "as is" produced water (or the guar gum in the glutaraldehyde-treated produced water).

Figure 2:
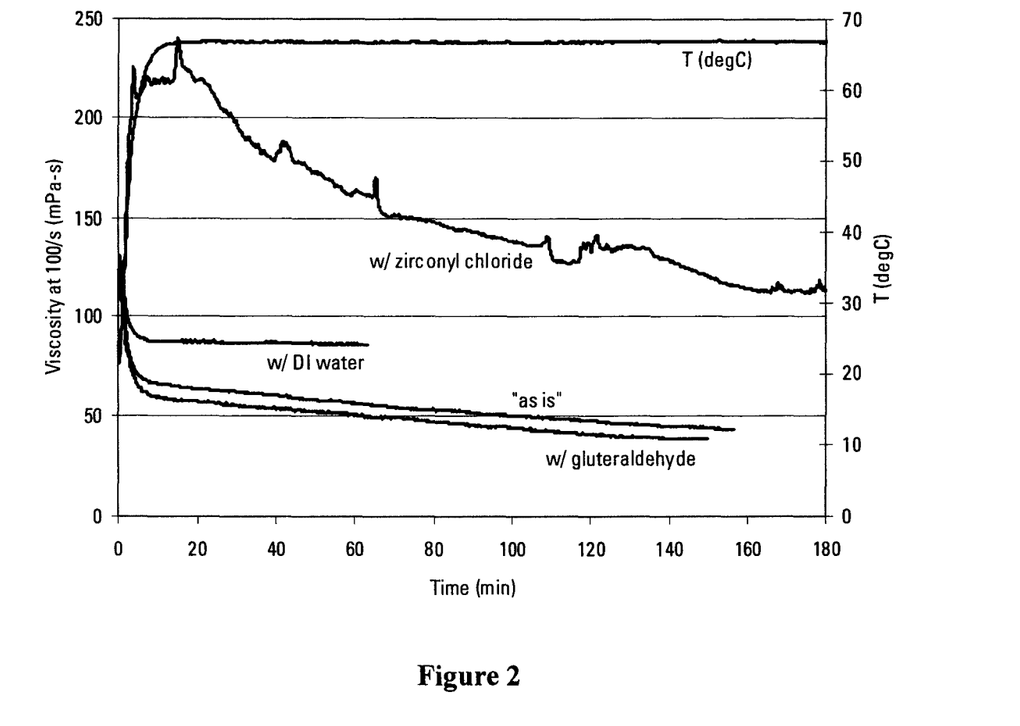
FIG. 2 shows viscosity profiles at 65.6 deg C. for guar gum in de-ionized water, guar gum in "as is" produced water, guar gum in produced water treated with glutaraldehyde, and guar gum in produced water treated with zirconyl chloride, respectively.

FIG. 2 shows the viscosity profiles at 65.6 deg C. (150 deg F.) for the 4 same fluids studied above in FIG. 1. At this higher temperature of 65.6 deg C., the declining viscosity of the fluid based upon the "as is" (untreated) or glutaraldehyde-treated produced water PW1 was more prominent compared with the control prepared with de-ionized (DI) water. The fluid based upon the zirconyl chloride-treated produced water still performed much better than the control. At 1 hour, the viscosity of the fluid based upon the zirconyl chloride-treated produced water was over 100% larger than the viscosity of the fluid based upon the "as is" produced water (or the guar gum in the glutaraldehyde-treated produced water). One possibility is that the role played by the zirconyl chloride is to denature the enzymes produced by the bacteria in the produced water, thus slowing down the damage to guar gum polymer chains by these enzymes. Other zirconium-containing materials act similarly as zirconyl chloride (data not shown). Also, it is observed that, use of the produced water without zirconyl chloride results in significantly lower fluid viscosity as compared with fluid based upon de-ionized water.

Figure 3:
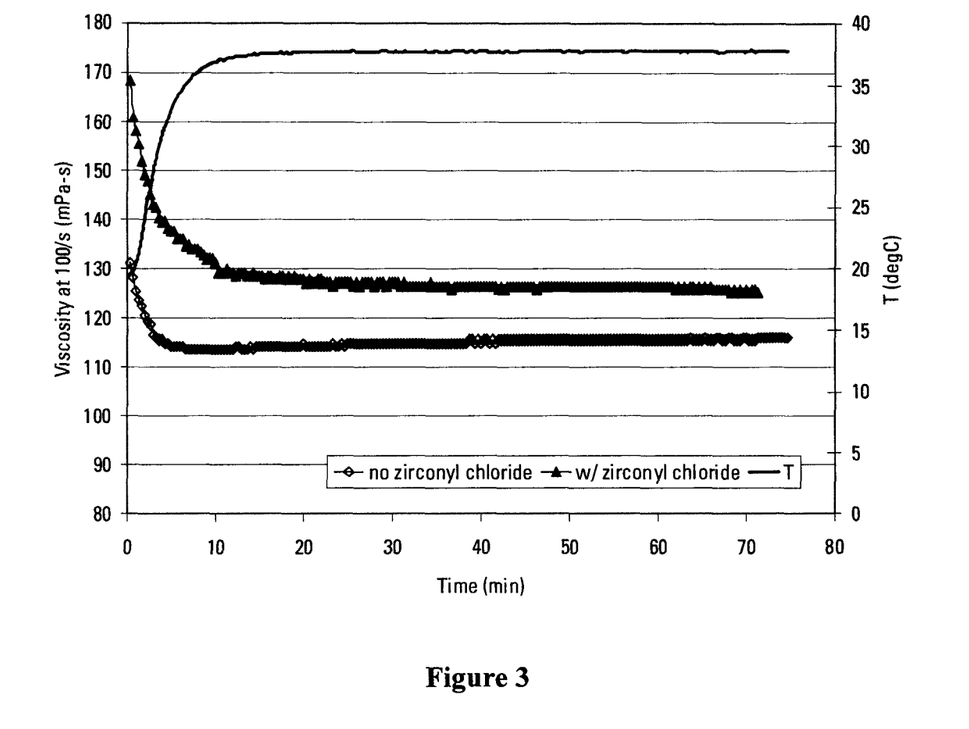
FIG. 3 shows viscosity profiles at 37.8 deg C. for guar gum and potassium chloride in de-ionized water, and guar gum, potassium chloride, and zirconyl chloride in de-ionized water, respectively.

To further better define function of zirconyl chloride, two fluids were prepared: (1) 0.48% guar gum and 2% KCl in de-ionized water, and (2) 0.48% guar gum, 2% KCl, and 0.0072% zirconyl chloride in de-ionized water. FIG. 3 shows the viscosity profiles at 37.8 deg C. for these two fluids. At 1 hour, the viscosity of the guar gum solution with the zirconyl chloride was about 9% higher than the viscosity of the fluid based up water without the zirconyl chloride. The zirconyl chloride might slightly viscosify the fluid, resulting in the 9% increase in viscosity for the guar gum in de-ionized water. Compared with the viscosity difference (over 70% increase) at 1 hour between the guar gum in the zirconyl chloride-treated produced water PW1 and the guar gum in the "as is" (untreated) produced water PW1 (as in FIG. 1), this 9% increase in viscosity for the guar in de-ionized water was much less significant. It is, therefore, reasonably likely that the denaturing of the bacteria enzymes by zirconyl chloride was the main reason of viscosity enhancement for the guar in produced water.

Figure 4:
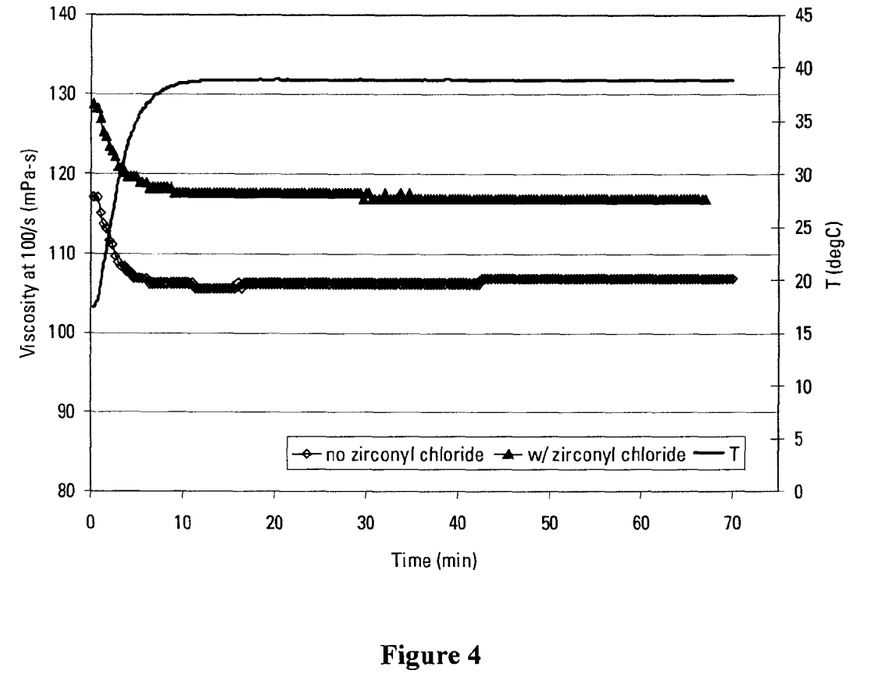
FIG. 4 shows viscosity profiles at 37.8 deg C. for anionic polyacrylamide in de-ionized water, and for anionic polyacrylamide and zirconyl chloride in de-ionized water, respectively.

FIG. 4 shows the viscosity profiles at 37.8 deg C. for two polyacrylamide fluids (polyacrylamide is also routinely used in slickwater): (1) 0.27% anionic polyacrylamide in de-ionized water, and (2) 0.27% anionic polyacrylamide and 0.0072% zirconyl chloride in de-ionized water. At 1 hour, the viscosity of the solution with the zirconyl chloride was about 9% greater than the viscosity without the zirconyl chloride. As polyacrylamide polymers are generally more resistant to bacteria and bacteria-generated enzymes, the addition of the zirconium compound may still enhance the fluid viscosity if not for protecting the polyacrylamide from the bacteria damage. The additional viscosity may further increase the particle transport capability of the polyacrylamide based fluids.

Figure 5:
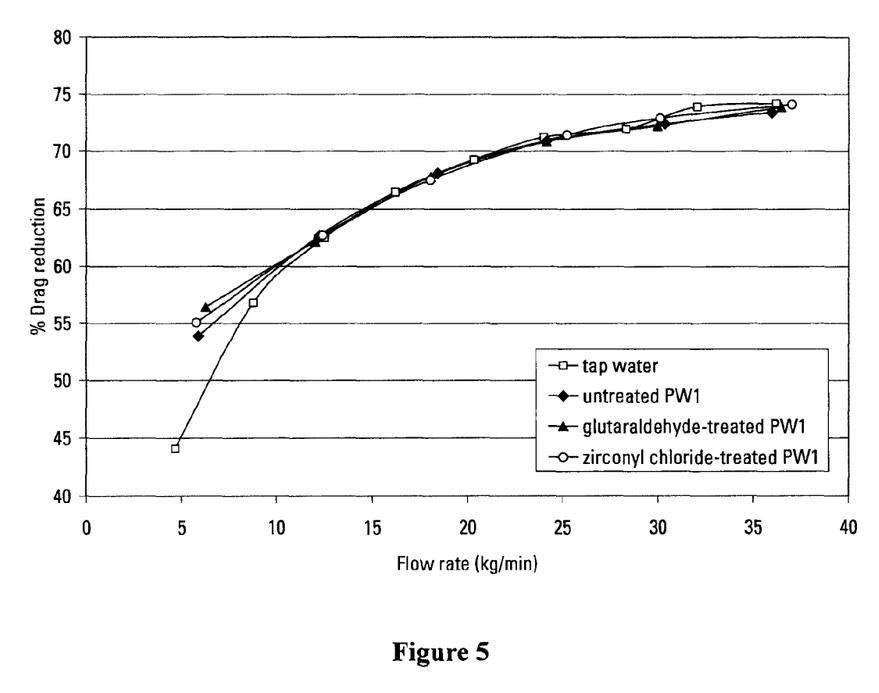
FIG. 5 shows a percent drag reduction (% DR) as a function of flow rate (kg/min) at about 20 deg C. for guar gum in tap water, guar gum in "as is" produced water, guar gum in produced water treated with glutaraldehyde, and guar gum in produced water treated with zirconyl chloride, respectively.

Friction loop testing of slickwater prepared with treated produced water was carried out at about 20 deg C. A friction loop consisting of a ½" and a ⅜" pipe was used for the measurements. The pressure difference (ΔP) across the pipes, the mass flow, and the temperature were recorded. The friction loop was calibrated with (clean) tap water. The % DR (percent drag reduction) is calculated using the following equation:

$$\% \ DR = \frac{\Delta Pwater - \Delta Pfluid}{\Delta Pwater} \times 100$$

Four fluids were tested: (1) 0.12% guar gum in the "as is" (untreated) produced water PW1, (2) 0.12% guar gum in the produced water PW1 treated with 0.005% glutaraldehyde, (3) 0.12% guar gum in the produced water PW1 treated with 0.0072% zirconyl chloride, and (4) 0.12% guar gum in tap water (clean water). The treating time of glutaraldehyde or zirconyl chloride was about 0-10 minutes or more. The hydration time of guar gum was 5 minutes. Right after the guar gum hydration, the fluid was loaded in the friction loop machine. FIG. 5 shows the percent drag reduction (% DR) as a function of the flow rate (kg/min) for the four fluids. The curves mostly overlap with each other, suggesting that the addition of zirconyl chloride did not lower the friction reduction ability of the slickwater. In summary, the examples presented in FIGS. 1, 2, and 5 suggest that the slickwater prepared with the zirconyl chloride-treated produced water possesses same friction reduction ability but greatly enhanced fluid viscosity. The enhanced fluid viscosity can be translated into better proppant-carrying ability.

Figure 6:
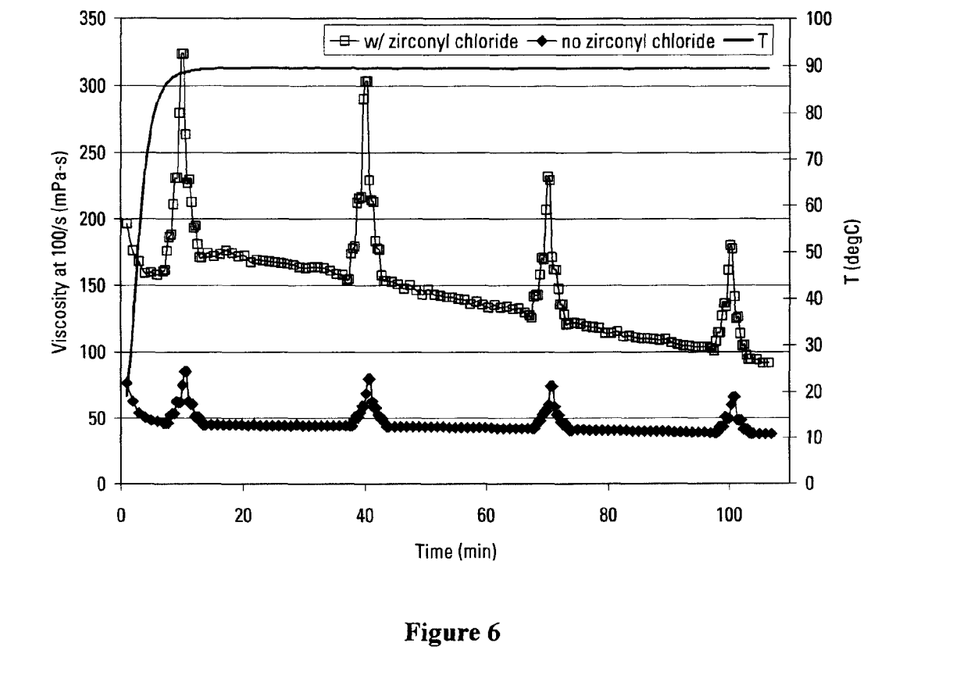
FIG. 6 shows viscosity profiles at 88 deg C. of titanate-crosslinked fluids prepared with "as is" (untreated) produced water and produced water treated with zirconyl chloride, respectively.

The produced water PW2 was treated with 0.01% zirconyl chloride for about 0-20 minutes or more. The tested fluid contains 0.48% guar gum, 0.16% acetic acid, and 0.16% triethanolamine titanate crosslinker. Other commonly used chemicals in the field, such as biocide, buffering agent, alcohols, high temperature stabilizer, and corrosion inhibitor may also be added. The pH of the fluid thus made was about 4, mimicking the pH of the related fluid energized with $CO_2$. The control fluid used the same produced water PW2 but without the zirconyl chloride treatment. The viscosity was tested at 87.8 deg C. (190 deg F.) with a HPHT Fann50-type viscometer, following the API RP 39 schedule, and the results are shown in FIG. 6. The zirconyl chloride treatment of the produced water significantly enhanced the viscosity and stability of the crosslinked fluid (and the related fluid energized with carbon dioxide or nitrogen or combined) at the working temperature.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method of treating a subterranean formation in a well comprising:
    a. providing an aqueous medium comprised at least in part of oilfield produced water comprising at least enzymes, microorganisms or combinations thereof;
    b. contacting the aqueous medium with a zirconium compound to at least inactivate the enzymes, the microorganisms or combinations thereof;
    c. energizing the combination of the aqueous medium and the inorganic zirconium compound with a gas;
    d. introducing the combination in to the well; and
    e. allowing the combination to contact the formation.

2. The method of claim 1 wherein the aqueous medium is oilfield produced water exclusively.

3. The method of claim 1 wherein the zirconium compound is an organo-zirconium compound.

4. The method of claim 1, further comprising:
    introducing proppant in to the well; whereby the combination of the aqueous medium and zirconium compound allows better transport capability of the proppant in to the formation compared to the aqueous medium alone.

5. The method of claim 1, wherein the gas is carbon dioxide, nitrogen, air, or combined.

6. The method of claim 3 wherein the organo-zirconium compound is selected from the group consisting of zirconium acetate, zirconyl acetate, zirconium acetylacetonate, zirconium glycolate, zirconium lactate, zirconium naphthenate, sodium zirconium lactate, triethanolamine zirconium, zirconium propionate, hydrates thereof and combinations thereof.

7. The method of claim 1 wherein the zirconium compound is an inorganic zirconium compound.

8. The method of claim 7 wherein the inorganic zirconium compound is selected from the group consisting of zirconium nitrate, zirconyl chloride, zirconium phosphate, zirconium potassium chloride, zirconium potassium fluoride, zirconium potassium sulfate, zirconium pyrophosphate, zirconium sulfate, zirconium tetrachloride, zirconium tetrafluoride, zirconium tetrabromide, zirconium tetraiodide, zirconyl carbonate, zirconyl hydroxynitrate, zirconyl sulfate, zirconium complexed with amino acids, zirconium complexed with phosphonic acids, hydrates thereof and combinations thereof.

* * * * *